(12) United States Patent
Gossage

(10) Patent No.: US 8,073,658 B2
(45) Date of Patent: Dec. 6, 2011

(54) MONTE CARLO SIMULATION USING GPU UNITS ON PERSONAL COMPUTERS

(75) Inventor: Kirk Gossage, Manchester, NH (US)

(73) Assignee: Cambridge Research & Instrumentation, Inc., Woburn, MA (US)

( * ) Notice: Subject to any disclaimer, the term of this patent is extended or adjusted under 35 U.S.C. 154(b) by 368 days.

(21) Appl. No.: 11/810,297

(22) Filed: Jun. 5, 2007

(65) Prior Publication Data

US 2007/0282575 A1 Dec. 6, 2007

Related U.S. Application Data

(60) Provisional application No. 60/810,957, filed on Jun. 5, 2006.

(51) Int. Cl.
G06F 7/60 (2006.01)
G06F 17/10 (2006.01)

(52) U.S. Cl. .......................................................... 703/2

(58) Field of Classification Search .......... 703/2; 356/39
See application file for complete search history.

(56) References Cited

U.S. PATENT DOCUMENTS

| | | | | |
|---|---|---|---|---|
| 5,548,539 | A * | 8/1996 | Vlach et al. | 703/6 |
| 7,403,812 | B2 * | 7/2008 | Rice et al. | 600/473 |
| 2003/0002028 | A1 * | 1/2003 | Rice et al. | 356/39 |
| 2004/0021771 | A1 * | 2/2004 | Stearns et al. | 348/131 |
| 2004/0249260 | A1 * | 12/2004 | Wang et al. | 600/407 |
| 2006/0242618 | A1 * | 10/2006 | Wang et al. | 716/19 |

OTHER PUBLICATIONS

Li et al., A Mouse Optical Simulation Environment (MOSE) to Investigate Bioluminescent Phenomena in the Living Mouse with the Monte Carlo Method. Academic Radiology, 11 (2004), 1029-1038.*
Rice et al., In vivo imaging of light-emitting probes. Journal of Biomedical Optics 6(4), (Oct. 2001), 432-440.*
Liu et al., Experimental validation of Monte Carlo modeling of fluorescence in tissues in the UV-visible spectrum. Journal of Biomedical Optics 8(2), (Apr. 2003), 223-236.*
Tomav et al., Benchmarking and Implementation of Probability-Based Simulations on Programmable Graphics Cards. Computers & Graphics, vol. 29, No. 1. (Feb. 2005), 71-80.*
Flock et al., "Monte Carlo modeling of light propagation in highly scattering tissues. I. Model predictions and comparison with diffusion theory", Biomedical Engineering, IEEE Transactions on vol. 36, Issue 12, (Dec. 1989), 1162-1168.*
Palmer et al, "Monte Carlo-based inverse model for calculating tissue optical properties. Part i: theory and validation on synthetic phantoms," Applied Optics, vol. 45, No. 5, (Feb. 2006), 1062-1071.*
D. Luebke, et al. How GPUs Work, Computer , Feb. 2007, printed from www.computer.org/portal/site/computer/ . . . on May 30, 2007.
Printout of the Software page and two Monte Carlo codes written by Scott Prahl, from the Oregon Medical Laser Center Website http://omlc.ogi.edu/software/, printed on May 31, 2007 and Jun. 5, 2007.

* cited by examiner

Primary Examiner — Dwin M Craig
Assistant Examiner — Aniss Chad
(74) Attorney, Agent, or Firm — Cozen O'Connor

(57) ABSTRACT

A method of performing a Monte Carlo analysis uses a graphical processor unit of a computer system, individual data sets to be analyzed are allocated to respective pixel locations in a graphical processor unit memory for Monte Carlo simulation and the outcome of the Monte Carlo simulation is calculated for each data set using stream processing in the graphical processor unit.

21 Claims, 4 Drawing Sheets

MONTE CARLO SIMULATION USING GPU UNITS ON PERSONAL COMPUTERS

CROSS REFERENCE TO RELATED APPLICATIONS

The present invention claims priority to U.S. Provisional Application No. 60/810,957, filed on Jun. 5, 2006.

BACKGROUND OF THE INVENTION

1. Field of the Invention

The present invention relates to a method of using a graphical processor unit (GPU) to run Monte Carlo simulations.

2. Description of the Related Art

Graphical processor units (GPUs) are routinely included in personal computers (PCs) to improve the ability of PCs to produce high-quality display images, especially in applications such as gaming, video editing, and other processing-intensive display tasks. The architecture of the GPU is chosen for efficient coupling to the computer's video system and provides an array of special-purpose processors, termed shaders, which have been optimized for display calculations. Because the number of shaders may be large, the GPU provides a massively parallel stream processor. While first-generation graphics hardware used integer mathematics, current GPUs provide shaders that perform full 32-bit precision floating point operations.

Monte Carlo methods are stochastic techniques that are routinely used to model complex processes in which one or more steps are considered random, or quasi-random. For example, propagation of particles in scattering media can be treated as random-walks where the probability of interaction and the strength of interaction are modeled using known or presumed statistical distributions. Typically, the propagation of a given particle is traced to its conclusion, and the process is then repeated a large number of times. By recording the results for many such trials, one obtains an estimate of what outcomes are likely. Often, many trials are required in order to get good predictive power.

The field of optical in-vivo imaging utilizes light-emitting substances such as fluorescent or luminescent materials to image structures within a living organism, wherein the light-emitting substance is generated or bound or utilizes innate optical properties of the tissue, such as scatter and/or absorption, to visualize structures. Based on measurements of light made at the surface of the animal, and parameters such as the light's spatial distribution, wavelength spectrum, and signal strength, an estimate of the depth and extent of the light-emitting material, and/or of the internal structures within the organism is made. Present results obtained this way are of low quality and/or take extreme amounts of computing power (minutes or hours).

SUMMARY OF THE INVENTION

An object of the present invention is to provide a method for performing probability analysis by running Monte Carlo simulations using a graphical processor unit (GPU).

The object is met, according to an embodiment of the present invention, by a method of performing a Monte Carlo analysis using a graphical processor unit, including the steps of allocating individual data sets to respective pixel locations in a graphical processor unit memory for a Monte Carlo simulation, and calculating the outcome of the Monte Carlo simulation for each data set using stream processing in the graphical processor unit.

The object of the present invention is also met, according to another embodiment of the present invention, by a computer system for performing Monte Carlo simulations, including a central processing unit, a main memory, and a graphical processing unit with a plurality of pixel shaders and a graphical processing unit memory, the central processing unit running an application comprising computer executable steps for allocating individual data sets to respective pixel locations in a graphical processor unit memory for a Monte Carlo simulation, and calculating the outcome of the Monte Carlo simulation for each data set using stream processing in the graphical processor unit.

The inventor of the present application has recognized that Monte Carlo simulations can be organized in a way that is amenable to processing by a GPU. This is accomplished by transforming the problem from a sequential problem to a parallel problem that is suited to the GPU. In one aspect of the invention, the transformation is accomplished by allocating pixel locations in GPU memory to individual Monte Carlo trials instead of spatial positions in an image. Thus, instead of using the GPU to calculate the display appearance at each of a million pixels, one may use the GPU to calculate the outcomes of a million Monte Carlo trials, wherein the relevant data for each trial is represented in pixels of one or more layers. The pixel shaders then iterate through trials rather than iterating through spatial positions in a display image.

An example of a GPU suitable for the present invention is Nvidia's model G80 GPU which has 128 pixel shaders. Pixel shaders are designed to work with pixels, each of which has separate values for red, green, blue, and alpha channels (RGBA), so it performs operation on these 4 channels simultaneously. This means that a total of 512 calculations may be performed at once. The GPU has several memory planes per pixel, so it can process an entire image efficiently, without data bottlenecks. As a result, the GPU achieves very high throughput for image processing calculations.

Monte Carlo simulations may be used to predict light transport in turbid media such as tissue for optical in-vivo analysis using a statistically-driven iterative approximation to the radiative transport equation. A Monte Carlo simulation may be performed to determine a propagation of a single individual photon through media with fixed or varying optical properties ($\mu a$, $\mu s$, g, and n). Based on the optical properties of the media, the photon has probability distribution functions (PDF) for mean free path, absorption, scattering, and scattering direction. Using these PDFs, each individual photon is followed through its path in the media and the location(s) where it is absorbed, transmitted, and reflected are recorded. Being a statistical based method, as opposed to an analytical solution, large numbers of photons are required to get a good approximation to the behavior of the light in tissue.

Monte Carlo simulation is considered to be a very time-consuming research tool since typically one must propagate hundreds of thousands to millions of photons in order to get good statistics. This takes a considerable time when calculated on a personal computer using a conventional CPU processor such as a Pentium. The CPU implementation of this algorithm entails each photon being sequentially followed through its path through the media until it was absorbed, transmitted, or reflected.

The present invention provides striking improvements in calculation speed over the prior art. For example, in one test, a Monte Carlo calculation which took 11.5 minutes in the CPU of a Dell Latitude was completed in 2.5 seconds using a GPU in accordance with the present invention. This revolutionary improvement in calculation speed enables new techniques and modes of use in the field of optical in-vivo imaging. For example, full Monte Carlo methods are not time-prohibitive when implemented on the GPU, so one may perform depth profiling, 3-D reconstruction, and other sample analysis using Monte Carlo simulations done on a GPU.

One may perform more Monte Carlo trials than provided for by the number of GPU pixels such as, for example, by running the GPU-based calculation repeatedly. Alternatively, one may perform a lesser number of trials. The latter is analogous to performing a graphical rendering at lower resolution. However, the number of trials is usually large enough that even at low resolution, many shaders are used in parallel, and a large speed improvement is obtained.

The time constraints associated with Monte Carlo simulations as a means for predicting light transport in a turbid media such as tissue are obviated by the present invention by having the GPU work on a large group of photons simultaneously, because the propagation of each photon can be approximated as being unrelated to the behavior of the other photons.

This approximation does not account for phenomena such as two-photon interactions, secondary fluorescence and re-emission, photon quenching, and the like. Yet it is a widely made assumption in Monte Carlo modeling, and valuable results are often obtained nonetheless. Grid-type simulations are possible, in which one seeks to account for multiple-photon interactions by recording which grid locations a given photon trial passes through, and thus accumulating a photon density grid; from this, the probability of multiple-photon events could be developed and incorporated into the Monte Carlo model. The incorporation of multiple-photon interaction has not been a primary focus of the present invention since most practical problems related to in-vivo are hobbled by computation-time, even in the simpler case where multiple-photon events are ignored. However, the calculation of multiple-photon events could be pursued within the scope of the present invention by at least the grid method.

The performance level of GPU technology is expected to increase at a faster rate than CPU technology, according to computer industry analysis. So, while both approaches will benefit from faster computing equipment, the GPU will improve to an even greater degree, and its relative advantage will increase in the future.

The embodiments of the present invention for Monte Carlo simulation are particularly valuable for in-vivo optical imaging, because the alternative algorithms for performing 3D reconstruction algorithms—and hence for predicting the distribution of light-emitting material within the animal—make use of first order analytical approximations to the full transport equation because of time constraints. These first order analytical approximations are only valid for certain conditions, and typically only work well for homogenous slab models, which are not representative of the actual biological specimens involved.

In contrast, the Monte Carlo approach is not subject to the same constraints and can easily be applied to very heterogeneous samples without compromising simplifications. It incorporates more of the sample complexity and physical mechanisms involved. However, it has been considered unsuitable to date because of the calculation burden of tracing a million pixels in order to get good photon statistics. The present invention renders the Monte Carlo approach practical by vastly reducing the calculation time, and enables more precise results to be obtained.

Other objects and features of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
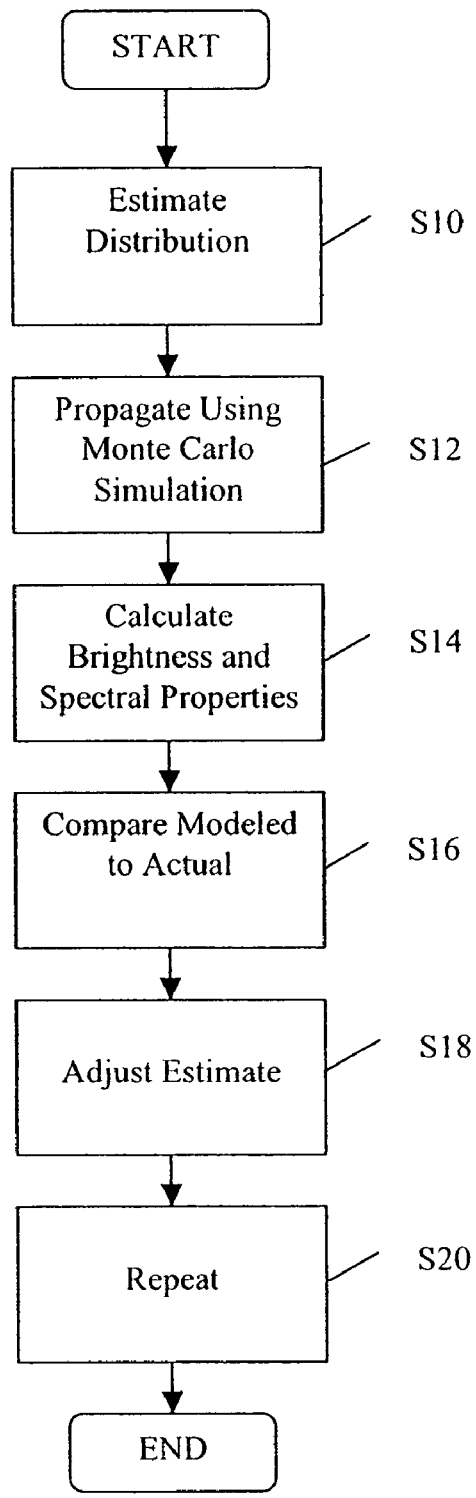
FIG. 1 is a flow diagram for 3-D reconstruction in optical in-vivo imaging for a bioluminescence molecular imaging case.

FIG. 1 is a flow diagram for 3-D reconstruction in optical in-vivo imaging for a bioluminescence molecular imaging case. In the overall approach to 3-D reconstruction, assumptions are made about a sample's optical properties. More specifically, an initial estimate of the distribution of light-emitting material, i.e., the starting points of the photons, is first made, step S10. This initial estimate is typically based on the measured radiation from the surface or outermost layer of the animal. A simulation of the photons propagating through the animal is performed using Monte Carlo simulation, step S12. The resulting brightness and spectral properties at the surface of the animal are calculated using the results of the Monte Carlo simulation, step S14. The modeled light signal at the surface of the animal calculated at step S12 is then compared with an actual observed light signal, step S16. Based on the difference determines in step S16, the internal distribution of light-emitters used by the Monte Carlo simulation is adjusted, step S18, and steps S10-S18 are performed iteratively until the modeled light signal agrees with the actual observed light signal within an acceptable error, step S20.

One aspect of the present invention involves parallel processing of the Monte Carlo simulations for propagation of the photons of step S12 using pixel shaders of a graphical processor unit (GPU). The pixel shaders of a GPU are designed to work with pixels, each of which has a separate value for red, green, blue, and alpha channels (RGBα). The pixel shaders are parallel processing units which read data (RGBα values) from a texture memory, perform a function or kernel, and write the output to a framebuffer. The function or kernel typically is used to generate, e.g., lighting effects, on the pixels of an image. The GPU has several memory planes per pixel so that it can process an entire image efficiently, without data bottlenecks.

To process the propagation of photons in parallel, the Monte Carlo simulation must be organized in a way that is amenable to processing by a GPU. This requires transforming the problem from a sequential type problem in which each photon simulation is performed sequentially, to a parallel problem in which a plurality of the photon simulations are performed in parallel. In a preferred embodiment all of the photon simulations are performed in parallel using the pixel shaders of the GPU.

Figure 2:
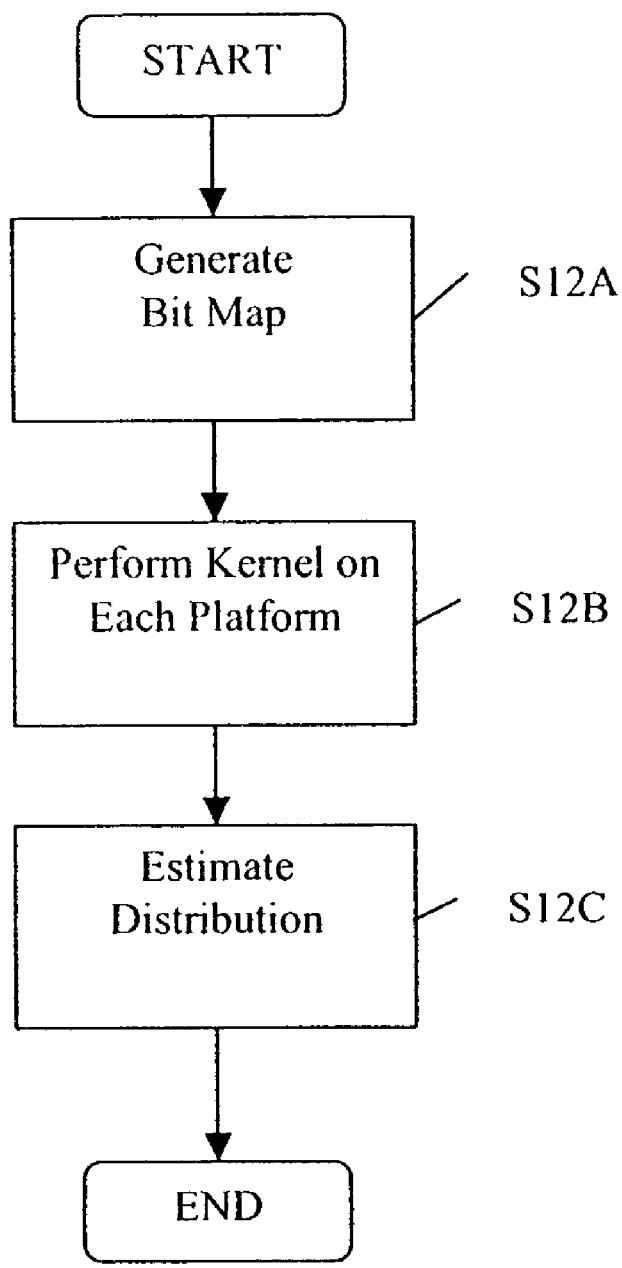
FIG. 2 is a flow diagram showing the substeps for implementing parallel Monte Carlo simulations using a GPU.

According to one embodiment of the present invention shown in FIG. 2, the photons are input to the GPU texture memory as a bit map, step S12-A, wherein the values of RGB channels of a pixel shader input represent the x, y, z coordinates of the photon. Accordingly, each photon is represented as a pixel in an image. A kernel is performed by each of the pixel shaders, step S12-B. The kernel to be performed by each pixel shader is a Monte Carlo code such as, for example, code written by Scott Prahl, which is publicly available at the Oregon Medical Laser Center's website. This kernel or program simulates light propagation and outputs x, y, z coordinates after propagation or where the photon was absorbed in the sample.

A 1024×1024 bit map image may be created to represent over a million photons. The assignment of a specific pixel location to a specific photon does not mean that this photon corresponds to that physical location, either as a starting point or an ending point in its path. While an image processing GPU is utilized, and the calculation is organized in terms of pixels, the GPU is not performing a conventional display calculation, but is instead tracking the outcome for a million photons as they propagate through a two- or three-dimensional sample.

In addition to using a graphics API such as DirectX, the GPU could be programmed using a GPU programming language such as CUDA by Nvidia™ to perform the above tasks directly on x, y, z data of the photons.

Figure 3:
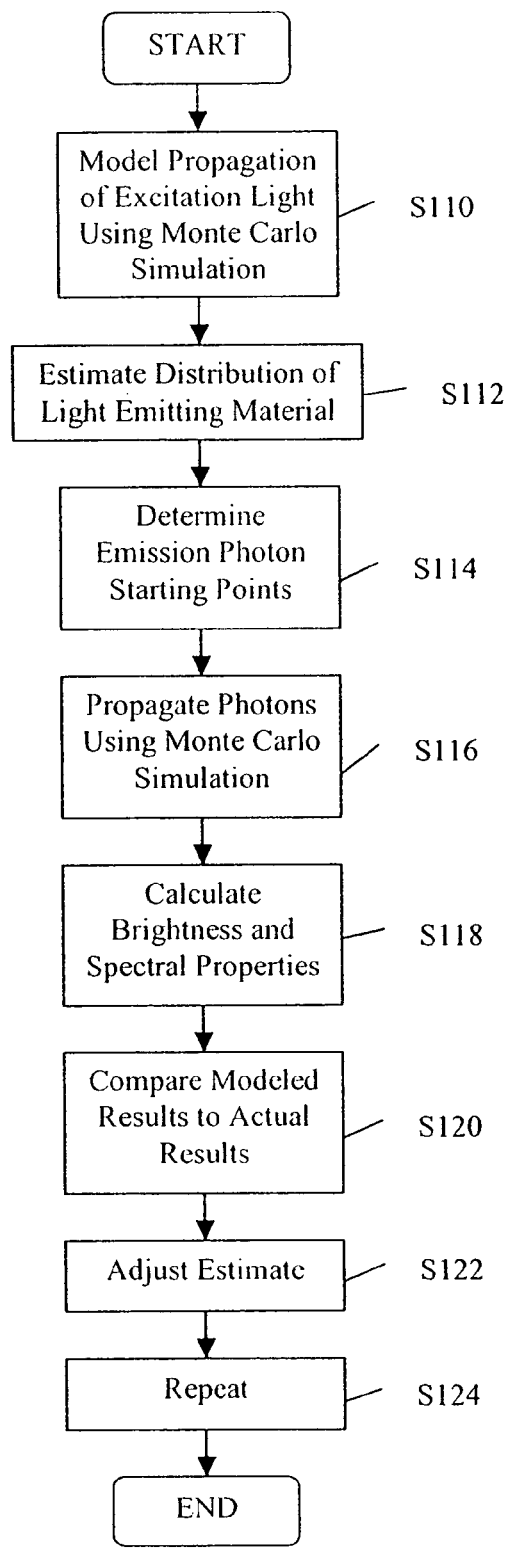
FIG. 3 is a flow diagram for 3-D reconstruction in optical in-vivo imaging for a fluorescence molecular imaging case.

For a fluorescence molecular imaging case, one may treat this in the same way as the bioluminescence case. This effectively assumes uniform excitation of the fluorescent material at all points within the organism. A more detailed model illustrated in the flow chart of FIG. 3 starts by modeling the propagation of excitation light from the surface of the animal, where it is applied, and determining how it propagates through the animal by Monte Carlo simulation, step S110. This simulation of the excitation light uses optical constants appropriate to the wavelength of excitation light, which may for example include visible or infrared light. The output of this step yields a distribution of excitation energy at internal points within the animal. An estimate of the distribution of light emitting material is made, step S112. The excitation field, combined with the distribution of light-emitting material, is then used to develop a probability distribution of photon starting points, step S114. These photons, in turn, propagate through the animal by further Monte Carlo simulation, which uses optical constants appropriate to the emission wavelengths of light, step S116. The resulting brightness and spectral properties at the surface of the animal are calculated using the results of the Monte Carlo simulation, step S118. The modeled light signal at the surface of the animal calculated at step S118 is then compared with an actual observed light signal, step S120. Based on the difference determined in step S120, the internal distribution of light-emitting material used by the Monte Carlo simulation is adjusted, step S122, and steps S110-S122 are performed iteratively until the modeled light signal agrees with the actual observed light signal within an acceptable error, step S124. In this way, an end-to-end model of the excitation and emission processes is developed.

This process can be used for in-vivo imaging of mice, humans, and any other animal where one wishes to view light through a scattering or absorptive layer of tissue. While it is especially valuable for non-invasive imaging of intact whole-animals, the process may also be applied to imaging through one or more layers of a specimen which has had some of the overlying material removed from the path. An example would be the use of the present invention to image structures within tissue while in the operating theatre.

In general, the above concept may be used to model any light interaction with tissue. For example, the present invention may be used to simulate laser/tissue interaction to determine the appropriate wavelength, power, and exposure time for treatment of conditions such as, for example, port wine stain. It may be used to determine the optical properties of materials. In this case, the Monte Carlo simulation is performed using different optical properties until the model output matches the actual output. The inventive method could also be used in depth estimate calculations by modeling a point source of a light at various depths. By including the absorption and scattering coefficients as a function of wavelength, the change in the spectrum of light measured at the surface as a function of depth could be determined.

Figure 4:
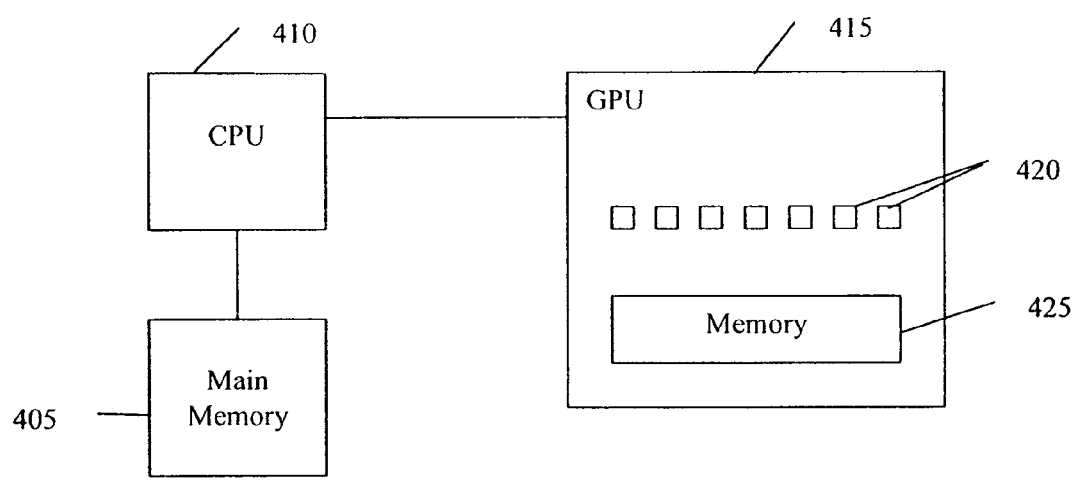
FIG. 4 is a block diagram of a computer system for implementing the present invention.

FIG. 4 is a computer system 400 used to implement the present invention. The computer system 400 includes a main memory 405, a central processing unit (CPU) 410, and a GPU 415 having a plurality of pixel shaders 420 and a GPU memory 425. According to the present invention, the CPU 410 runs an application which allocates data sets in the main memory (or generated by a program), which is to be subjected to a Monte Carlo simulation, to pixel locations in the GPU memory 425. The pixel shaders 420 perform the Monte Carlo simulation on each of the data sets to calculate an outcome. A statistical distribution is accumulated for the outcomes of the Monte Carlo simulations.

Although the above examples describe using all four values, represented as RGBA, in the GPU's 4-vector processors, the present invention also applies to Monte Carlo simulations where the data being read in could contain pixel vector lengths of 1, 2, 3, or 4. In addition, some cases may require more than four pieces of information per trial. In that case, more than one image may be used as the input, wherein the same pixel location in each of the images contains the relevant information for one trial. For example, in the case in which light includes a location and a direction vector, the RGB of a pixel in one image may include starting location information x, y, z for a trial and the RGB of the same pixel in a second image may include starting direction information $U_x$, $U_y$, $U_z$.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of performing a Monte Carlo analysis using a graphical processor unit having an array of shaders, comprising the steps of:

allocating individual data sets to respective shaders in the graphical processor unit for a Monte Carlo simulation, wherein the data sets each comprise data for an individual Monte Carlo trial and are not related to a display calculation for pixel locations; and calculating, by the shaders, the outcome of the Monte Carlo simulation for each data set using parallel stream processing, wherein the graphical processor unit includes a memory having a plurality of pixel locations, each of the pixel locations is a unit of memory for storing values for color space parameter channels, and each of the shaders is designed to work on the units of memory of the pixel locations, wherein said step of allocating comprises creating a bit map image and inputting the bit map image to the graphical processor unit memory, wherein at least one of color space parameter channels of each pixel of the bit map image includes values representative of the data set.

2. The method of claim 1, wherein the Monte Carlo simulation simulates propagation of a particle through a medium.

3. The method of claim 1, wherein the Monte Carlo simulation simulated propagation of a photon in a sample tissue.

4. The method of claim 3, wherein the outcome is used for in vivo imaging.

5. The method of claim 1, wherein the individual data sets represent starting points of photons in a sample for bioluminescence molecular imaging and the Monte Carlo simulations simulate propagation of the photons through a tissue.

6. The method of claim 1, wherein the individual data sets represent starting points of excitation light for fluorescence molecular imaging and the Monte Carlo simulations simulate propagation of the photons through a tissue.

7. The method of claim 6, wherein the outcome of the Monte Carlo simulations yields a distribution of excitation energy within the tissue, wherein a further step of allocating is performed to allocate starting points of fluorescence photons and a further step of calculating is performed, the Monte Carlo simulation of the second step of calculating simulating propagation of the fluorescence photons in the tissue.

8. The method of claim 1, wherein the values for the color space parameter channels stored in the each of the pixel locations are values for red, green, blue, and alpha channels, wherein at least one of the red, green, blue, and alpha channels of each pixel of the bit map image includes values representative of the data set.

9. The method of claim 8, wherein the data sets each represent a two dimensional location and two of the red, green blue, and alpha channels of the each pixel of the bit map image represent x, y coordinates of the location.

10. The method of claim 8, wherein the data sets each represent a three dimensional location and three of the red, green blue, and alpha channels of the each pixel of the bit map image represent x, y, z coordinates of the location.

11. The method of claim 1, further comprising the step of accumulating statistical distribution of the outcomes of the Monte Carlo simulations.

12. A computer system for performing Monte Carlo simulations, comprising:
 a central processing unit;
 a main memory; and
 a graphical processing unit with a plurality of pixel shaders and a graphical processing unit memory;

the central processing unit running an application comprising computer executable steps of allocating individual data sets to respective pixel shaders in the graphical processor unit for a Monte Carlo simulation, wherein the data sets each comprise data for an individual Monte Carlo trial and are not related to a display calculation for pixel locations, and calculating, by the shaders, the outcome of the Monte Carlo simulation for each data set using parallel stream processing, wherein said graphical processing unit memory has a plurality of pixel locations, each of the pixel locations is a unit of memory for storing values for color space parameter channels, each of the pixel shaders is designed to work on the units of memory of the pixel locations, said step of allocating comprises creating a bit map image and inputting the bit map image to the graphical processor unit memory, wherein at least one of the color space parameter channels of each pixel of the bit map image includes values representative of the data set.

13. The computer system of claim 12, wherein the application further comprises a computer executable step of accumulating statistical distribution of the outcome of the Monte Carlo simulations.

14. The computer system of claim 12, wherein the Monte Carlo simulation simulates propagation of a particle through a medium.

15. The computer system of claim 12, wherein the Monte Carlo simulation simulated propagation of a photon in a sample tissue.

16. The computer system of claim 15, wherein the outcome is used for in vivo imaging.

17. The computer system of claim 12, wherein the individual data sets represent starting points of photons in a sample for bioluminescence molecular imaging and the Monte Carlo simulations simulate propagation of the photons through a tissue.

18. The computer system of claim 12, wherein the individual data sets represent starting points of excitation light for fluorescence molecular imaging and the Monte Carlo simulations simulate propagation of the photons through a tissue.

19. The computer system of claim 18, wherein the outcome of the Monte Carlo simulations yields a distribution of excitation energy within the tissue, wherein a further step of allocating is performed to allocate starting points of fluorescence photons and a further step of calculating is performed, the Monte Carlo simulation of the second step of calculating simulating propagation of the fluorescence photons in the tissue.

20. The computer system of claim 12, wherein the values for the color space parameter channels stored at said each of the pixel locations are values for red, green, blue, and alpha channels, wherein at least one of the red, green, blue, and alpha channels of each pixel of the bit map image includes values representative of the data set.

21. The computer system of claim 20, wherein the data sets each represent a three dimensional location and three of the red, green blue, and alpha channels represent x, y, z coordinates of the location.

* * * * *